(12) United States Patent
Herzberg et al.

(10) Patent No.: US 6,768,737 B1
(45) Date of Patent: *Jul. 27, 2004

(54) CONTROL AND MAINTENANCE OF MULTICAST DISTRIBUTION EMPLOYING EMBEDDED DISPLAYS

(75) Inventors: Louis Paul Herzberg, Monsey, NY (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 783 days.

This patent is subject to a terminal disclaimer.

(21) Appl. No.: 09/590,204

(22) Filed: Jun. 8, 2000

Related U.S. Application Data

(60) Provisional application No. 60/138,172, filed on Jun. 8, 1999.

(51) Int. Cl.[7] .............................................. G06F 17/00
(52) U.S. Cl. ........................ 370/390; 370/408; 707/102
(58) Field of Search ................................ 370/390, 400, 370/408, 410; 707/102

(56) References Cited

U.S. PATENT DOCUMENTS

| | | | | | |
|---|---|---|---|---|---|
| 5,355,371 | A | * | 10/1994 | Auerbach et al. | 370/408 |
| 5,926,463 | A | * | 7/1999 | Ahearn et al. | 370/410 |
| 6,078,590 | A | * | 6/2000 | Farinacci et al. | 370/400 |
| 6,088,336 | A | * | 7/2000 | Tosey | 370/408 |
| 6,321,270 | B1 | * | 11/2001 | Crawley | 370/390 |
| 6,647,394 | B1 | * | 11/2003 | Herzberg et al. | 707/102 |

* cited by examiner

Primary Examiner—Salvatore Cangialosi
(74) Attorney, Agent, or Firm—Scully, Scott, Murphy & Presser; Louis P. Herzberg

(57) ABSTRACT

A method and system for providing multilevel information about multicast distribution. The method comprises the steps of generating a display, on a computer display screen, of a tree having a plurality of nodes, and embedding in the nodes information about the multicast distribution. The tree may display information about one or more of a variety of aspects of the multicast distribution. These aspects include display of the members of each of a plurality of particular multicast groups, group and/or member connectivity, group parameters, group statistics control, monitor and maintenance; acknowledge and/or operational status, etc. As a specific example, the nodes may represent capacities of a defined aspect. Displays may allow users having particular privileges to add, delete and/or modify nodes. Geometric shapes, having geometric aspects, may be used to represent the nodes; and the aspects of these shapes may be used to represent predetermined aspect of the multicast distribution. Also, a controller may be used to perform certain aspects of the multicast distribution, and information about these aspects of the multicast distribution may be embedded in the nodes.

42 Claims, 8 Drawing Sheets

A Method of Providing Multilevel Information About Multicast Distribution

Generating a display, on a computer display screen, of a tree having a pluarlity of nodes Embedding in the nodes information about the multicast distribution

CONTROL AND MAINTENANCE OF MULTICAST DISTRIBUTION EMPLOYING EMBEDDED DISPLAYS

CROSS REFERENCE

This application claims priority from U.S. Provisional Application No. 60/138,172, filed on Jun. 8, 1999.

This application is also related to the following copending applications, filed herewith, Ser. No. 09/590,205, "Controlling, Configuring, Storing, Monitoring And Maintaining Accounting Or Bookkeeping Information Employing Trees With Nodes Having Embedded Information,";

Ser. No. 09/590,323, "Method Of Control, Maintenance And Allocation Of Computer Server Farms Resources And Other Resource Farms To Their Users,";

Ser. No. 09/590,203, "Video-On-Demand configuring, Controlling And Maintaining,"; and Ser. No. 09/590,206, "Doing Business Employing Linked Trees Having Retrievable Embedded Information,"; now U.S. Pat. No. 6,647,394;

which are all incorporated herein by reference in entirety.

This application is also cross referenced with copending application Ser. No. 09/327,708, entitled, "Representing, Configuring, Administering, Monitoring, and/or Modeling Connections Using Catalogs and Matrixes," by E. H. Booth et al., filed Jun. 8, 1999, the disclosure of which is incorporated herein by reference in entirety;

The disclosure of this application is related to the disclosures of the following U.S. Patents:

U.S. Pat. No. 5,289,460, "Maintenance of Message Distribution Trees in a Communications Network," by Drake, Jr. et al., issued Feb. 22, 1994;

U.S. Pat. No. 5,724,646, "Fixed video-on-demand," by A. Ganek et al., issued Mar. 3, 1998;

U.S. Pat. No. 5,682,597, "Hybrid Video-on-demand Based on a Near-video-on-demand System," by A. Ganek et al., issued Oct. 28, 1997;

U.S. Pat. No. 5,459,725, "Reliable Multicasting over Spanning Trees in Packet Communications Networks," by Bodner, R. A. et al., issued Oct. 17, 1995;

U.S. Pat. No. 4,277,837, "Personal Portable Terminal for Financial Transactions," by Stuckert, P. E. issued Jul. 7, 1981;

U.S. Pat. No. 4,106,667, "Apparatus and Method for Conducting Financial Transactions," by Lynott, J. J., issued Aug. 15, 1978;

which are all incorporated herein by reference in entirety.

BACKGROUND OF THE INVENTION

This invention generally relates to the use of displays for the control and maintenance of multicast distributions. More specifically, the invention relates to making information about multicast distribution accessible from a display of a multicast connection tree.

Multicast, point to multipoint, transmission is used when a destination address relates to a specified group of logically related users, or stations. A trivial case is when a group is composed of all the users and/or stations on a network. Although much work is in progress in developing optimal and/or efficient multicast trees for the multicast transmission, much information that is specific to each specific user and/or group is not readily accessible to potential users and/or administrators of the specific information. It would be advantageous that this information be available in a systematic and useful way. It is particularly useful to have this information accessible from a display of a multicast connection tree.

One specific, important problem is to provide a way for representing, managing and controlling large datastores of multicast information relating to resource utilization, connection management and service availability for multicast file distribution etc. Network administrators (and users) need tools to retrieve and view distribution status organized in a number of different formats (by user, by host, by connection type etc.), as well as simple means of forming, querying, adding and deleting information from the store.

SUMMARY OF THE INVENTION

An aspect of this invention is to use embedded representations to provide multilevel information display availability of multicast and multicast related information.

Another aspect of the present invention is to provide a display tree, which shows multicast information, and to allow bi-directional or multidirectional progression along the tree.

These and other aspects are attained with a method and system for providing multilevel information about multicast distribution. The method comprises the steps of generating a display, on a computer display screen, of a tree having a plurality of nodes, and embedding in the nodes information about the multicast distribution.

The tree may display information about one or more of a variety of embodiments of the multicast distribution. These embodiments include display of the members of each of a plurality of particular multicast groups, group and/or member connectivity, group parameters, group statistics control, monitor and maintenance; acknowledge and/or operational status, etc. As a specific example, the nodes may represent capacities of a defined embodiment.

Displays may allow users having particular privileges to add, delete and/or modify nodes. Geometric shapes, having geometric embodiments, may be used to represent the nodes; and the embodiments of these shapes may be used to represent predetermined embodiment of the multicast distribution. Also, a controller may be used to perform certain embodiments of the multicast distribution, and information about these embodiments of the multicast distribution may be embedded in the nodes.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
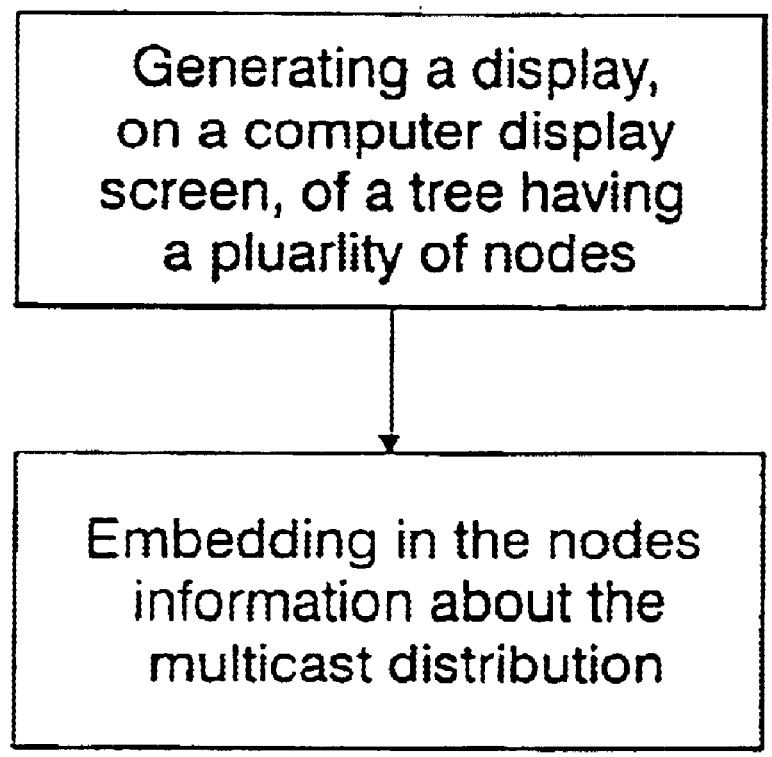
FIG. 1 is a flow chart generally outlining a preferred embodiment of the present invention.
Figure 2:
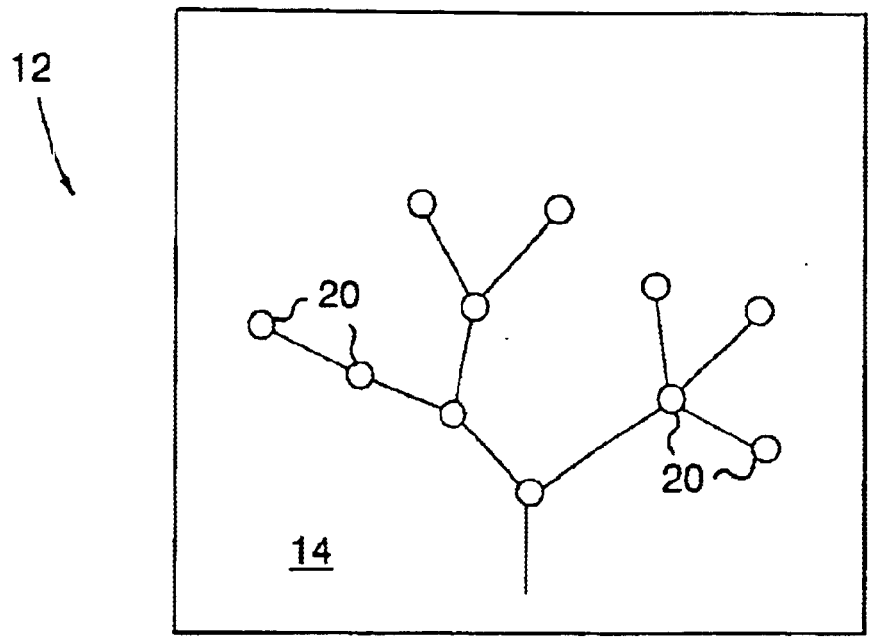
FIG. 2 shows a display of a tree that may be used in the practice of this invention.
Figure 3:
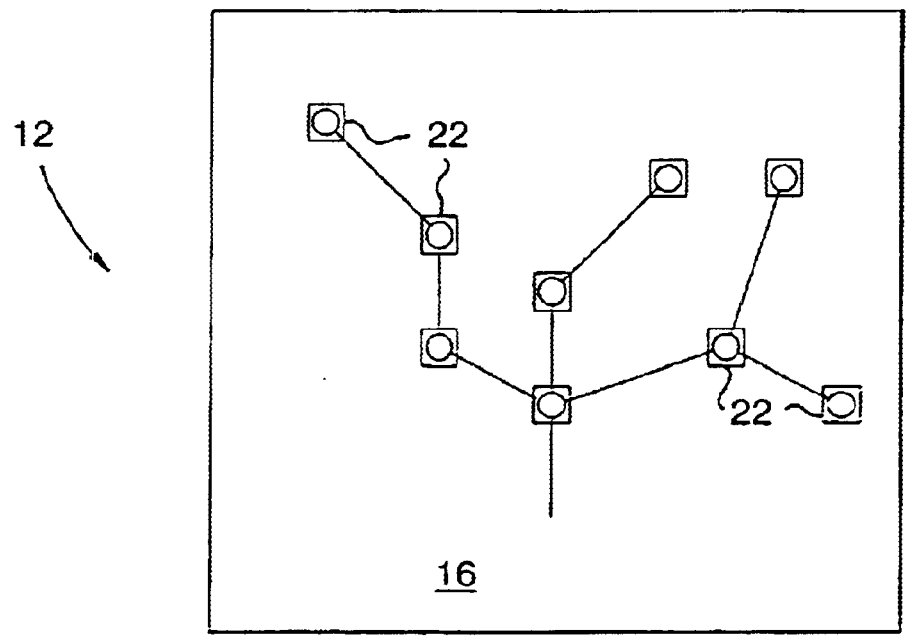
FIG. 3 illustrates an alternate display tree, in which the nodes are enclosed in rectangles.

With reference to FIGS. 1–3, the present invention uses embedded representations to provide multilevel information display availability of multicast and multicast related information. This information is available in embodiments allowing bi-directional or multidirectional progression along a particular displayed tree. There are a variety of multicast specific and nonspecific displayed trees. These include displays of the members of each of a plurality of particular multicast groups, group and/or member connectivity, group parameters, group statistics control, monitor and maintenance; acknowledge and/or operational status, etc. FIGS. 2 and 3 illustrate, as example, displays 12 of two trees 14 and 16 that may be used in this invention. Tree 14 includes a plurality of nodes 20, and tree 16 includes a plurality of nodes 22.

Although the trees in FIGS. 2 and 3 are shown bottom up (extending upward from the root node), trees may similarly be formed and/or displayed top down (extending downward from the root node), sideways (from the root node) or in any combination of these (as known to those skilled in the art). The particular tree formation and/or display is formed as is best suited to the particular application and/or display, and in accordance with the desire of a viewer or user. In some embodiments these display variations are selectable by the user. When more than one tree is displayed (e.g. in a split screen utilization), each tree may be formed and/or displayed in a different form/shape.

For example, in an embodiment, a display displays one or more particular embodiments or attributes defining the display. For instance, a display may be based on: a hierarchy of user's privileges, and/or billing rates, and/or user location, and/or logical relationship, and/or network connection, etc. Any of these displays shows (optionally selected) a partial or complete tree representation of the particular embodiment or attribute. Each tree node is denoted by its specific call-out or representation name.

One embodiment assigns capacities to nodes, trees and leaves, i.e., for summing up the tree billing rates, or rates going down the tree. For example, a given tree may represent a total capacity of X that will be allocated to a multicast group. One could then allocate to each first level branch some portion of the multicast capacity, one could continue this process. For example, in IGS in the Web Hosting area, a tree can represent a customer's Web Site processing capacity that IGS provides. The allowable capacity is displayed, for the total sets of web pages that a customer wants, as a tree of sets web pages.

For instance, a particular customer may have bought 400M cycles of multicast (or other) processing for their web site to be divided among 5 Web services, using the ratio of 25%, 10%, 15%, 40% and 10%. Further, say that the first service (the 25% one) was further divided among 3 Web services. This is managed at the top level, or by descending the tree to lower levels. A customer could also be allowed to manipulate the bottom of the tree, but not the top, so that the customer can manage some portion of the capacity that is allocated to it but not alter the total capacity.

Usually, each node is enclosed in a rectangle, for example as shown in FIG. 3. Preferably, the rectangle also contains other specific information about the node. In an embodiment, the entire rectangle (or, advantageously, parts of the rectangle), is shown in particular colors to visually denote node information. In some embodiments, information is also contained in the intensity of the color representing the information. Thus for example, the intensity of a color on a segment of the rectangle representing the amount of network (multicast) usage indicates an amount of the nodes (multicast) network usage. A rectangle segment may also indicate whether the node is presently active or inactive etc. Differing direction and/or spaced (variously) cross hatched lines are also used to provide visual node information. A rectangle segment can be made up of or could contain a bar graph (like the commonly used percentage completion bar graphs used in most GUI interfaces to show percentage completion of activity, such as a file transfer) that indicated the percentage of nodes that are active or inactive.

In an embodiment, a class of nodes is given a privilege of being able to be both a receiver and a transmitter of multicast files or messages. Another class of nodes has only receiving rights of multicast files or messages. A class of nodes is given pseudo-administration privileges allowing each such node to view all or a (designated) portion of the various displays and corresponding single or multidirectional levels of information embedded in one or more of the displayed rectangles. In a further embodiment, the various displays may be toggled from one to another. A more complex embodiment allows the overlay (with or without an offset) of one display by another display. Each or all of these capabilities/classes/privileges are indicated (optionally) on each node's rectangle.

Furthermore, displays allow users having particular privileges to add, delete and/or modify nodes. Nodes may be moved from one group to another, e.g. a new billing group, etc. Nodes may be required to request (or be directed to request) inclusion in a multicast group and/or acknowledge receipt of a file or message. Groups may be subdivided into sub-groups, where each file or message is encoded to be received or receivable by a particular sub-group. In an embodiment, nodes at any level of a display may in themselves trees of a plurality of other nodes. These other nodes may again be in themselves be trees of still another plurality of still other nodes etc. In some cases, a particular node may be represented in more than one tree and at more than one level. This generally depends upon the design and utilization of the tree and its upper (parent) and lower (child) levels.

One preferred characteristic of this invention is that the tree can be cyclic, i.e., a leaf can be attached to multiple branches. Thus, one can have a multicast tree with alternate paths to reach the leaf. One can then specify a weighting method to cause one path to be preferred over all other paths. Those trees can represent a multicast system that has redundant or backup paths within the system and a way to specify which paths are active.

Although it is often advantageous to employ binary trees, the present invention is useful with any multicast tree designation and/or representation. It provides the advantages of making available many levels of embedded multicast information simultaneously or in progression. This is particularly useful for setting up, connecting, monitoring, controlling, administering and maintaining the particular multicast utilization's desired and/or required by a particular application.

It is advantageous to have one or more multicast controllers and/or sub-controllers. A plurality of controllers enables the sharing of administrative, monitoring and maintenance tasks. Each controller evaluates a priority of transmission of the multicast file or message to each group/sub-group and/or user within each group or sub-group. For example, a low time-of-multicast-transmission priority allows the controller to delay the multicast message for an amount of time. The controller may choose to combine a plurality of multicast messages (received during a collection time window) to be sent simultaneously to particular receivers.

A controller may consider the variation in the cost of transmission with the time of day or night. When the time-of-multicast-transmission priority allows, the controller may delay the multicast transmission to take place in the night (or a dynamically determined low traffic period) when (telephone) network costs are least expensive. The controller also groups together in batches a group of receivers that use a common connecting link such that only one copy of the file or message is sent on the connecting link. The file or message is made redundant only at a last point required by the separation of particular receivers of the multicast message. Any or all of these priorities, transmission costs, etc. are advantageously embedded in particular levels of a group, node, or administrator display. The embedded information is retrieved by clicking on one or a block (included in a marked sector) of display rectangles. In an example embodiment, some sub-controllers are routers wherein a particular router sends routing tables to a multicast group that includes the particular router's communications routing family.

Figure 4:
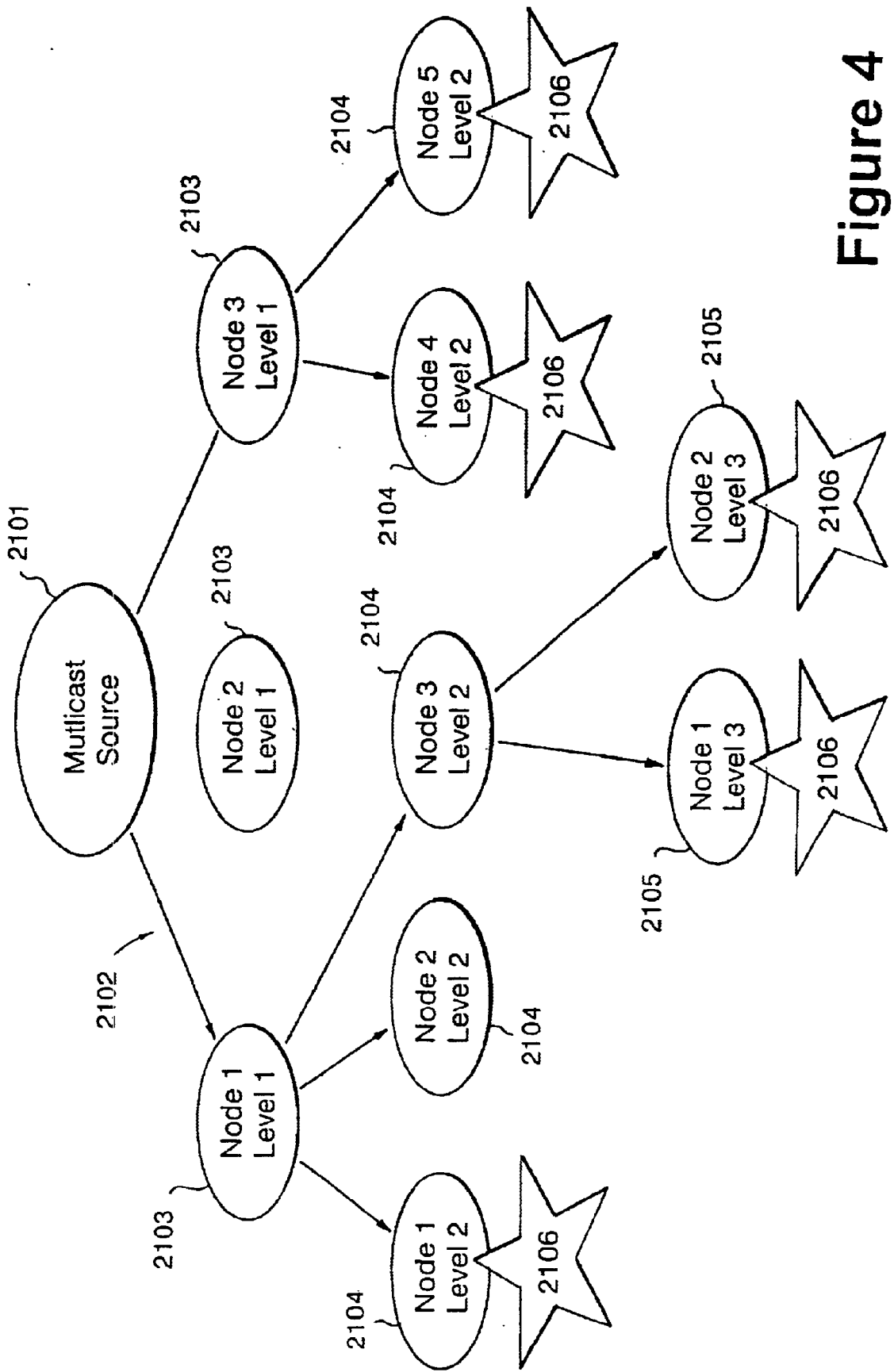
FIG. 4 represents a procedure for managing the physical topology of a network for multicast streams.
Figure 5:
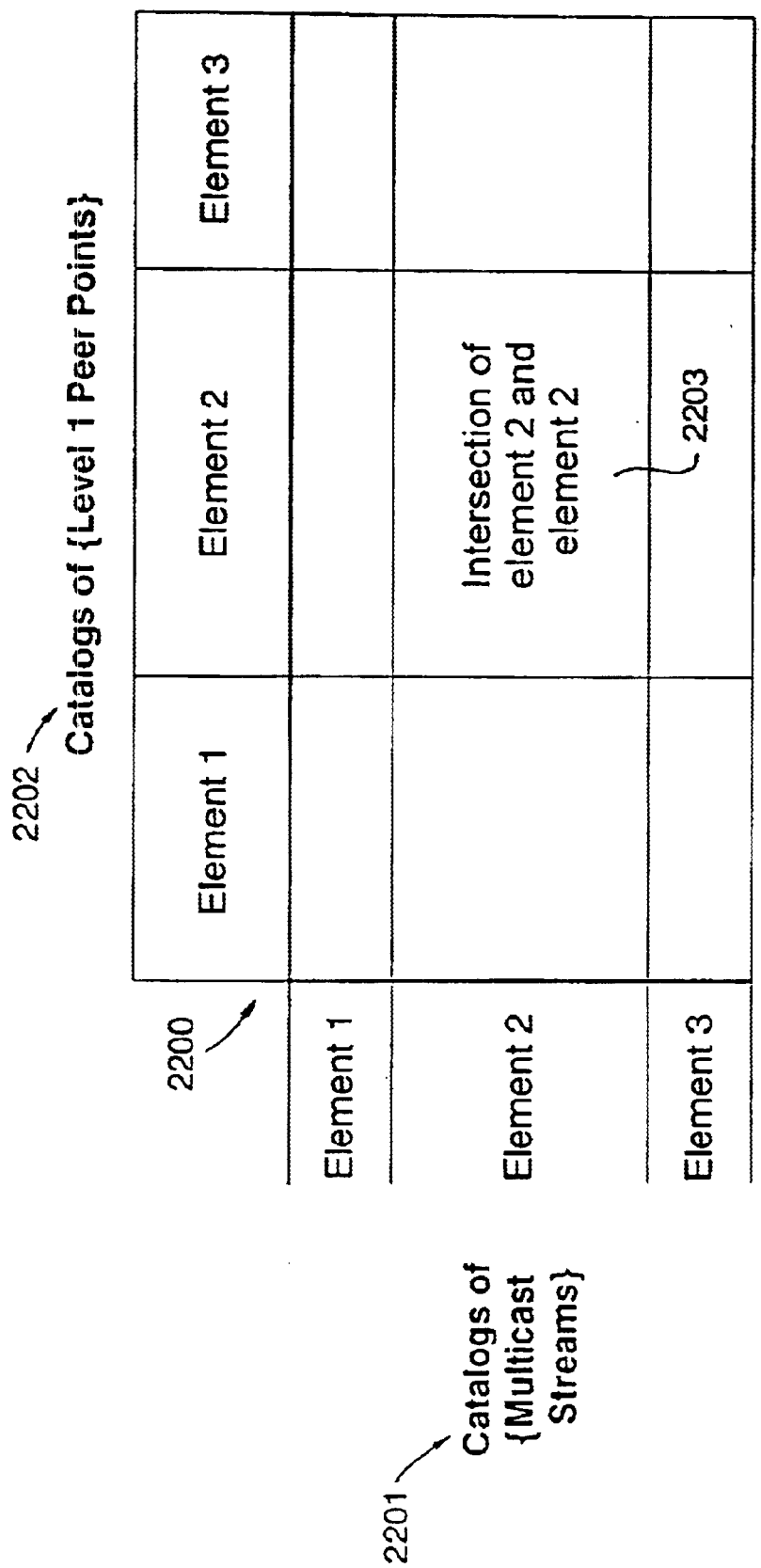
FIG. 5 illustrates a matrix method used to define or display a network topology.

One embodiment allows one to manage the physical topology of a network for multicast streams, as represented in FIG. 4. In FIG. 4, a network with a source, 2101, has the physical ability to send multicast streams, 2101, to down stream nodes, 2103, 2104, with ultimate destination given by 2106. The matrix method can be used to define or display the topology. In this case, as shown in FIG. 5, the matrix, 2200, assigns a multicast stream from a catalog of multicast streams, 2201, to a row. Note that there can be n rows, representing n multicast streams. The columns are elements of a catalog, 2202, which represent the multicast split points in the network at a common peer level.

Figure 6:
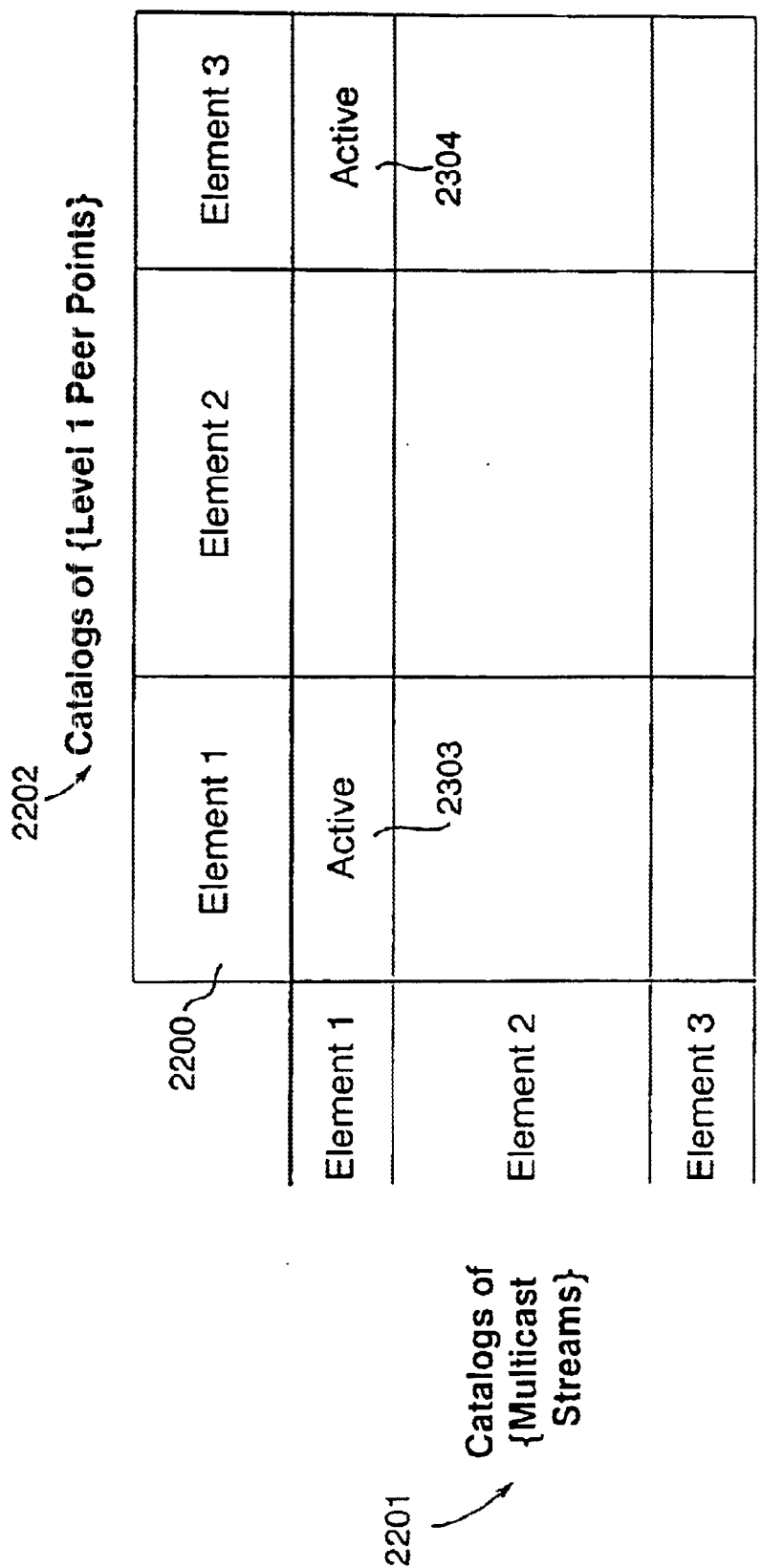
FIG. 6 also shows a matrix with embedded information.
Figure 7:
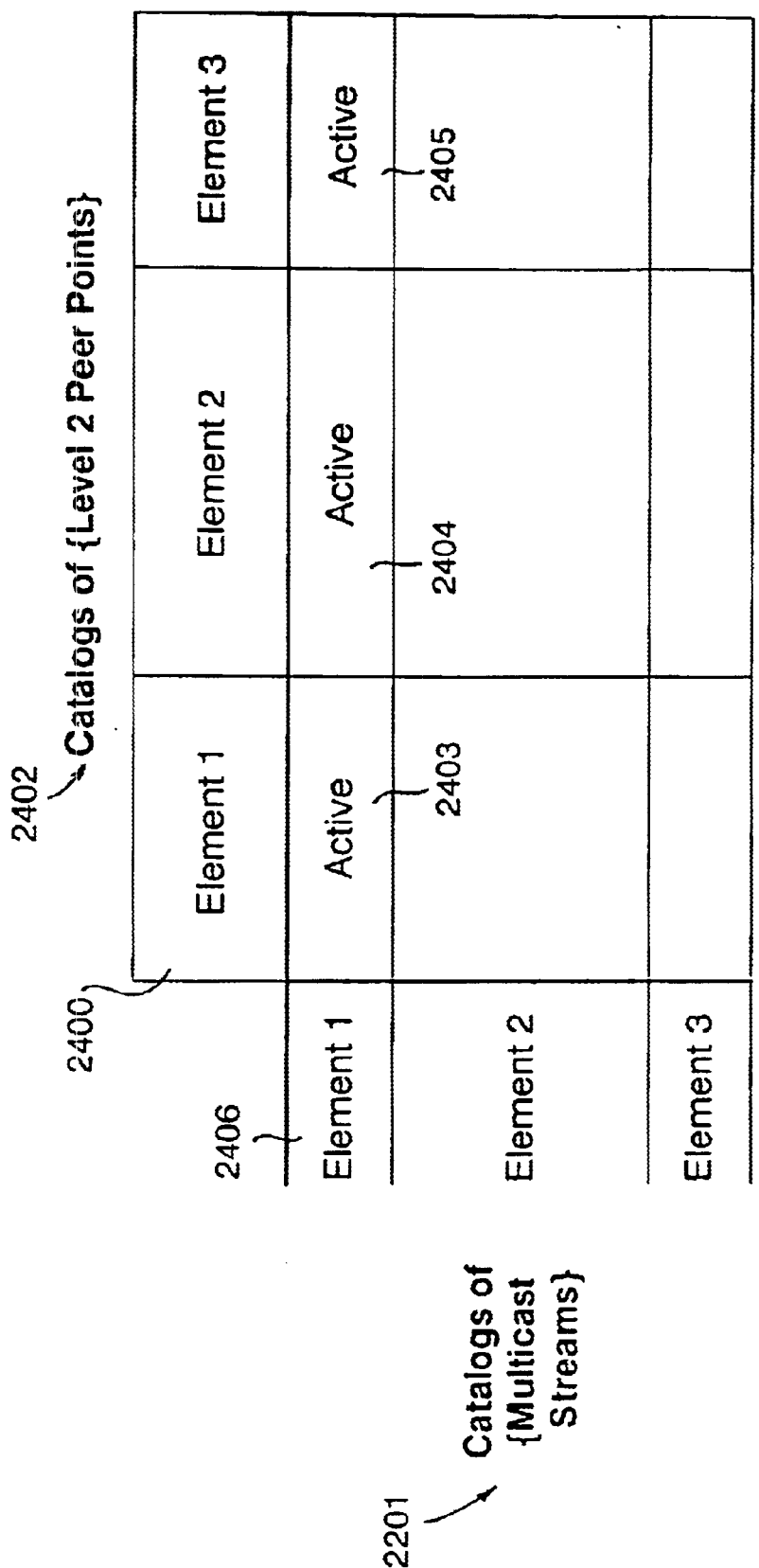
FIG. 7 shows a matrix expanded from a point of the matrix of FIG. 6.

To enable a node to distribute the multicast stream, an intersection point is selected and activated, 2203. Because a matrix element can represent a distribution point and all the elements found in the path after that point, one can expand the matrix at that point into another matrix showing the nodes that logically make up or are down stream of the distribution point. These can then be managed. FIGS. 6 and 7 show the matrix, 2200, and the active intersection points in the matrix representing the $1^{st}$ peer level, 2303 has been selected and a new matrix, 2400's columns represents elements in the catalog of level 2 nodes, 2402. As can be seen, the intersections 2403, 2404, 2405 shows multicast path that originates at node 1, level 1, 2103.

Additional modifications to matrices and/or cell/element to represent satisfaction of multicast provider and/or receiver requirements, such as a list of network and/or ultimate multicast user groups/types, multicast user statistics regarding such things as demand as a function of: group age range, group education, group geography, group viewing time of day, group request for particular information and/or response to advertisements; success and satisfaction rate to different multicast formats, equipment and/or technologies; multicast satisfaction failure rate and failure causes; rate of transmission completion; cost monitoring information; etc.

Further modifications to satisfy particular multicast user requirements, such as a list of equipment multicast user has to receive multicast; charge (if any) variations; special features and offers; statistics regarding multicast groups to whom the multicast was transmitted including multicast needs; transmission reliability and efficacy; etc.

As will be understood by those of ordinary skill in the art, any suitable processor, computer or computer network may be used to perform the calculations necessary to carry out the present invention. For example, software for performing these calculations may be embedded in a processor. Alternately, dedicated hardware may be used to perform the calculations.

Figure 8:
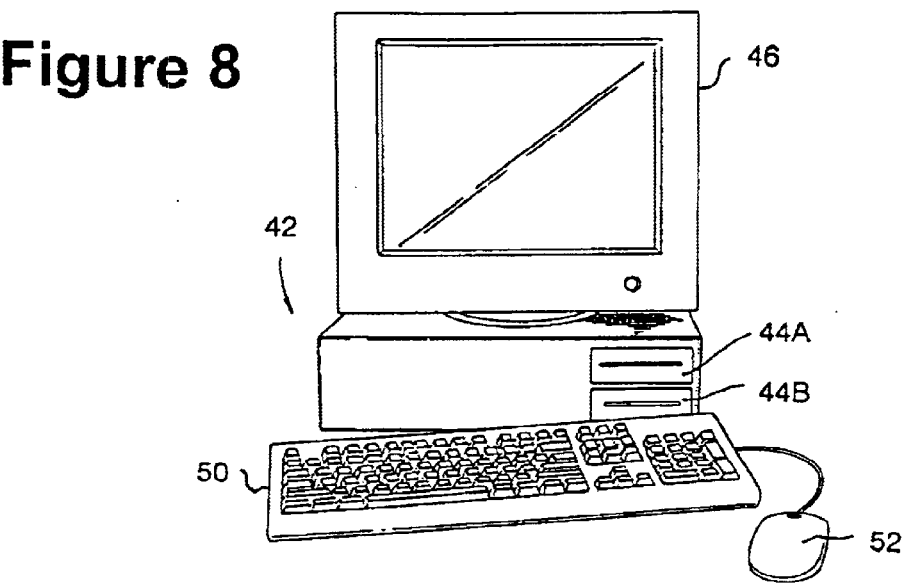
FIGS. 8 and 9 show a computer system that may be used in the invention.

A computer or computer network may also be used to perform the calculation; and FIG. 8 illustrates, as an example, a computer of a type that may be used in the practice of this invention. Viewed externally in FIG. 8, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

Figure 9:
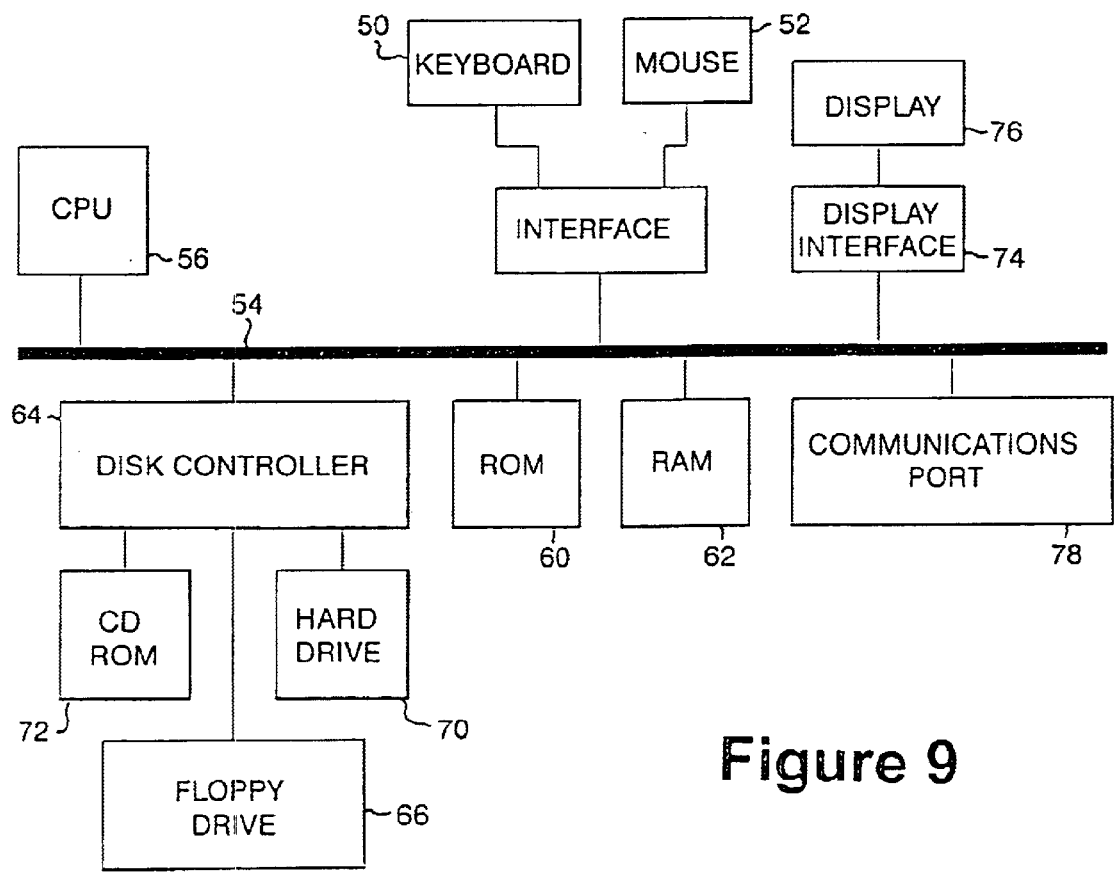

FIG. 9 shows a block diagram of the internal hardware of the computer of FIG. 8. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 10:
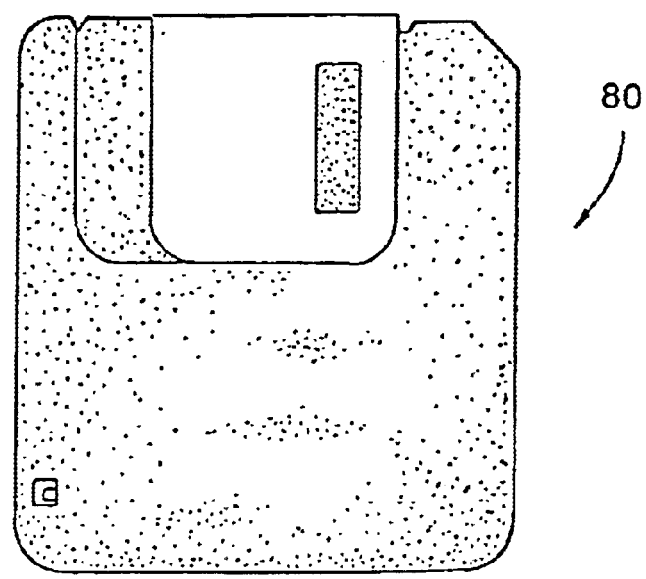
FIG. 10 illustrates a memory medium that can be used to hold a computer program for carrying out this invention.

FIG. 10 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

Some embodiments provide for any combination of the following capabilities: matrix and/or element expansion; logical set manipulation of catalog elements to form changed and/or new matrices, changed and/or new elements, and/or changed and/or new catalogs; catalog manipulation an/or combination; formation of one or more super-catalogs and/or super-elements representing a catalog of catalogs; display of a plurality of trees and/or portions of trees in a variety of tree formats and shapes; and formation and/or manipulation of sub-catalogs and/or sub-elements from one or more catalogs, matrices and/or elements.

Figure 11:
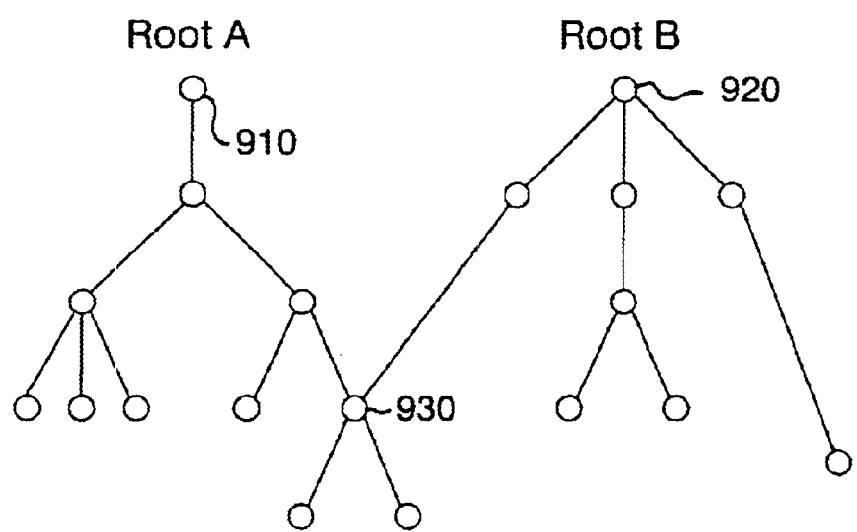
FIG. 11 shows an alternate tree display.

In some embodiments a tree may have more than one so called root node, as shown in FIG. 11. The elements/nodes emanating from each of the plurality of roots 910 and 920 may be common and be ultimately connected to each root at any subsequent tree level as appropriate to the application.

Thus node 930 is shown to be ultimately connected to root-A 910 and root-B 920. An example of this occurs when root-A 910 represents corporate division-A and root-B 920 represents corporate division-B, and node 930 represent the costs of a shared legal department.

While it is apparent that the invention herein disclosed is well calculated to fulfill the embodiments stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of providing multilevel information about multicast distribution, comprising the steps:

generating a display, on a computer display screen, of a tree having a plurality of nodes: and embedding in the nodes information about the multicast distribution.

2. A method according to claim 1, wherein the tree displays information about an aspect of the multicast distribution, said aspect being selected from the group comprising (i) members of each of a plurality of particular multicast group, (ii) group connectivity, (iii) member connectivity, (iv) group parameters, (iv) group statistics control, (vi) monitoring and maintenance information, (vi) acknowledgment status, (vii) operational status, (viii) physical topology, and any combinations of these.

3. A method according to claim 1, wherein the nodes represent capacities of a defined aspect.

4. A method according to claim 1, further comprising the step of allowing users having particular privileges to change nodes of the tree.

5. A method according to claim 1, further comprising the steps of:

using geometric shapes having geometric aspects to represent the nodes; and using the aspects of the shape to represent predetermined aspect of the multicast distribution.

6. A method according to claim 1, wherein a controller is used to perform defined aspects of the multicast distribution, and wherein the embedding step includes the step of embedding in the nodes information about aspects of the multicast performed by the controller.

7. A system for providing multilevel information about multicast distribution, comprising:

a computer display screen;

means for generating, on a computer display screen, a display of a tree having a plurality of nodes: and means for embedding in the nodes information about the multicast distribution.

8. A system according to claim 7, wherein the tree displays information about an aspect of the multicast distribution, said aspect being selected from the group comprising (i) members of each of a plurality of particular multicast group, (ii) group connectivity, (iii) member connectivity, (iv) group parameters, (iv) group statistics control, (vi) monitoring and maintenance information, (vi) acknowledgment status, (vii) operational status, (viii) physical topology, and any combinations of these.

9. A system according to claim 7, wherein the nodes represent capacities of a defined aspect.

10. A system according to claim 7, further comprising means for allowing users having particular privileges to change nodes of the tree.

11. A system according to claim 7, further comprising:

means for using geometric shapes having geometric aspects to represent the nodes; and means for using the aspects of the shape to represent predetermined aspect of the multicast distribution.

12. A system according to claim 7, wherein a controller is used to perform defined aspects of the multicast distribution, and wherein the embedding step includes the step of embedding in the nodes information about aspects of the multicast performed by the controller.

13. A program storage device readable by machine, tangibly embodying a program of instructions executable by the machine to perform method steps for providing multilevel information about multicast distribution, said method steps comprising:

generating a display, on a computer display screen, of a tree having a plurality of nodes: and embedding in the nodes information about the multicast distribution.

14. A program storage device according to claim 13, wherein the tree displays information about an aspect of the multicast distribution, said aspect being selected from the group comprising (i) members of each of a plurality of particular multicast group, (ii) group connectivity, (iii) member connectivity, (iv) group parameters, (iv) group statistics control, (vi) monitoring and maintenance information, (vi) acknowledgment status, (vii) operational status, (viii) physical topology, and any combinations of these.

15. A program storage device according to claim 13, wherein the nodes represent capacities of a defined aspect.

16. A program storage device according to claim 13, wherein the method further comprises the step of allowing users having particular privileges to change nodes of the tree.

17. A program storage device according to claim 13, wherein said method further comprises the steps of:

using geometric shapes having geometric aspects to represent the nodes; and using the aspects of the shape to represent predetermined aspect of the multicast distribution.

18. A program storage device according to claim 13, wherein a controller is used to perform defined aspects of the multicast distribution, and wherein the embedding step includes the step of embedding in the nodes information about aspects of the multicast performed by the controller.

19. A method as recited in claim 1, further comprising implementing at least one process taken from a group of processes including: matrix and/or element expansion; logical set manipulation of catalog elements to form changed and/or new matrices, changed and/or new elements, and/or changed and/or new catalogs; catalog manipulation and/or combination; formation of one or more super-catalogs and/or super-elements representing a catalog of catalogs; display of a plurality of trees and/or portions of trees in a variety of tree formats and shapes; and formation and/or manipulation of sub-catalogs and/or sub-elements from one or more catalogs, matrices and/or elements.

20. A method as recited in claim 1, wherein the tree is displayed sideways.

21. A method as recited in claim 1, wherein the tree is a combination of a plurality of sub-trees.

22. A method as recited in claim 21, wherein at least two of the sub-trees have at least one node in common.

23. A method as recited in claim 22, wherein said at least one node in common includes multicast groups that have been dropped based on a dropping criteria.

24. A method as recited in claim 22, wherein the dropping criteria is a lack of proper connectivity.

25. An article of manufacture comprising a computer usable medium having computer readable program code means embodied therein for causing provision of multilevel information about relationships between users and items of multicast distribution, the computer readable program code means in said article of manufacture comprising computer readable program code means for causing a computer to effect the steps of claim 1.

26. A method for representing interconnection of a plurality of elements of a multicast system, the method comprising:

providing a first catalog for a first subset of said elements, and providing a second catalog for a second subset of said elements;

creating a matrix of connection cells formed by an intersection of a pair of elements, wherein a first element of each pair is taken from the first catalog and a second element of each pair is taken from the second catalog; and forming a connection representation for at least a subset of the pairs.

27. A method as recited in claim 26, wherein at least one element is a catalog of sub-elements, and the method further comprises the step of including all sub-elements in the matrix.

28. A method as recited in claim 26, wherein at least one of the catalogs includes a plurality of sub-catalogs.

29. A method as recited in claim 26, wherein at least a portion of one catalog is formed using combinatorial operations upon elements of other catalogs.

30. A method as recited in claim 26, further comprising displaying at least one portion of the matrix.

31. A method as recited in claim 26, further comprising employing a wizard to form at least a subset of the elements.

32. An article of manufacture comprising a computer usable medium having computer readable program code means embodied therein for causing representation of interconnection of a plurality of elements of a multicast system, the computer readable program code means in said article of manufacture comprising computer readable program code means for causing a computer to effect the steps of claim 26.

33. An architecture comprising:

a matrix module forming a multicast information system matrix having at least one matrix row element and at least one matrix column element, an intersection of each said at least one matrix row element with each said at least one matrix column element forming a matrix cell;

a set of multicast elements, a first subset of said set having a connection requirement with a second subset of said set;

a first catalog including at least one multicast element forming said at least one matrix row element; and a second catalog including at least one multicast element forming said at least one matrix column element, wherein each matrix cell represents a multicast connection between each multicast element of the first catalog and each multicast element of the second catalog to enable systematic cooperation among multicast elements according to a multicast requirement.

34. An architecture as recited in claim 33, wherein at least one multicast element is a catalog of multicast sub-elements.

35. An architecture as recited in claim 33, wherein at least one multicast element is a catalog of elements only peripherally related to multicast.

36. An architecture as recited in claim 35, wherein the catalog of elements only peripherally related to multicast includes an item selected from the group of items including customer habits, customer credit card and/or internet purchases, customer's friends, and customer product data.

37. A method of providing multilevel information about a plurality of multicast related entities and resources, comprising the steps:

generating a display, on a computer display screen, of a tree having a plurality of nodes: and embedding in the nodes information about the a plurality of multicast related entities and resources.

38. A method as recited in claim 37, wherein the plurality of multicast related entities and resources include an entity and/or resource selected from: multicast providers; multicast maintainers/manufacturers; multicast related sellers; multicast advertisers; multicast databases; and any combination of the above.

39. An article of manufacture comprising a computer usable medium having computer readable program code means embodied therein for causing provision of multilevel information about relationships between users and items of a plurality of multicast related entities and resources, the computer readable program code means in said article of manufacture comprising computer readable program code means for causing a computer to effect the steps of claim 37.

40. An article of manufacture as recited in claim 39, wherein the multicast resources include holdings of groups of multicast related products.

41. An article of manufacture as recited in claim 39, wherein the relationships include multicast transmission information.

42. A method as recited in claim 1, wherein the tree is a cyclic tree.

* * * * *